US011645836B1

(12) United States Patent
Manevitz et al.

(10) Patent No.: US 11,645,836 B1
(45) Date of Patent: May 9, 2023

(54) ADVERSARIAL DETECTION USING DISCRIMINATOR MODEL OF GENERATIVE ADVERSARIAL NETWORK ARCHITECTURE (71) Applicant: Intuit Inc., Mountain View, CA (US)

(72) Inventors: Miriam Hanna Manevitz, Hasharon (IL); Aviv Ben Arie, Hasharon (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 17/855,699

(22) Filed: Jun. 30, 2022

(51) Int. Cl.
*G06V 10/82* (2022.01)
*G06V 10/774* (2022.01)
*G06N 3/02* (2006.01)
*G06N 3/045* (2023.01)

(52) U.S. Cl.
CPC ............ *G06V 10/82* (2022.01); *G06N 3/045* (2023.01); *G06V 10/774* (2022.01)

(58) Field of Classification Search
CPC ..... G06V 10/82; G06V 10/774; G06N 3/0454
See application file for complete search history.

(56) References Cited

U.S. PATENT DOCUMENTS

| 11,252,188 | B1* | 2/2022 | Lantuh | H04L 63/029 |
|---|---|---|---|---|
| 2021/0073692 | A1* | 3/2021 | Saha | G06V 10/764 |
| 2021/0158570 | A1* | 5/2021 | Mohandoss | H04N 1/6052 |
| 2021/0271591 | A1* | 9/2021 | Trost | G06N 3/047 |
| 2022/0198587 | A1* | 6/2022 | Shi | G06N 3/08 |

* cited by examiner

*Primary Examiner* — John W Lee
(74) *Attorney, Agent, or Firm* — Ferguson Braswell Fraser Kubasta PC (57) ABSTRACT

A method includes training, using first real data objects, a generative adversarial network having a generator model and a discriminator model to create a trained generator model that generates realistic data, and training, using adversarial data objects and second real data objects, the discriminator model to output an authenticity binary class for the adversarial data objects and the second real data objects. The method further includes deploying the discriminator model to a production system. In the production system, the discriminator model outputs the authenticity binary class to a system classifier model.

18 Claims, 6 Drawing Sheets

ADVERSARIAL DETECTION USING DISCRIMINATOR MODEL OF GENERATIVE ADVERSARIAL NETWORK ARCHITECTURE

BACKGROUND

Machine learning involves training, during a training phase, a machine learning model using training data, and then using the machine learning model in production on new data to determine information about the new data. In supervised machine learning, the training data may be real data that is associated with the expected output. The accuracy of the machine learning model is dependent, in part, on the quantity and quality of the training data. Thus, a challenge that exists is when an insufficient quantity of real training data exists. To address the challenge, a generative adversarial network (GAN) may be used to generate new training data. A generative adversarial network includes a generator model that generates training data and a discriminator model that is used to train the generator model. The generator model and discriminator model act as adversaries to each other. The generator model generates training data and the discriminator model is used to improve the quality of the training data.

SUMMARY

In general, in one aspect, one or more embodiments relate to a method that includes training, using first real data objects, a generative adversarial network having a generator model and a discriminator model to create a trained generator model that generates realistic data, and training, using adversarial data objects and second real data objects, the discriminator model to output an authenticity binary class for the adversarial data objects and the second real data objects. The method further includes deploying the discriminator model to a production system. In the production system, the discriminator model outputs the authenticity binary class to a system classifier model.

A system that includes a generative adversarial network including a generator model and a discriminator model. The generative adversarial network is trained, using first real data objects, to create a trained generator model that generates realistic data. The system further includes a discriminator model fine tuning training system that includes the discriminator model. The discriminator model fine tuning training system is configured to train, using adversarial data objects and second real data objects, the discriminator model to output an authenticity binary class for the adversarial data objects and the real data objects. The system is configured to deploy the discriminator model to a production system. In the production system, the discriminator model outputs the authenticity binary class to a system classifier model.

In general, in one aspect, one or more embodiments relate to a method that includes training, using first real data objects, a generative adversarial network having a generator model and a discriminator model to create a trained generator model that generates realistic data, and training, using adversarial data objects and second real data objects, the discriminator model to output an authenticity binary class for the adversarial data objects and the second real data objects. The method further includes processing, by the discriminator model, an unknown data object to generate the authenticity binary class for the unknown data object, processing, by a system classifier model connected to the discriminator model, the unknown data object and the authenticity binary class to generate an output, and presenting the output.

Other aspects of the invention will be apparent from the following description and the appended claims.

BRIEF DESCRIPTION OF DRAWINGS

Like elements in the various figures are denoted by like reference numerals for consistency.

DETAILED DESCRIPTION

In general, embodiments are directed to repurposing a discriminator model in a generative adversarial network to determine authenticity of new data object in production. Specifically, the discriminator model from the generative adversarial network is used in production to output an identifier of whether the new data object is real or synthetic. A system classifier may then classify the data object based on real or synthetic identifier.

The generative adversarial network is an adversarial network in which a generator model attempts to trick the discriminator model into incorrectly classifying generated training data objects as being real data objects. The discriminator model is an adversary to the generative model and attempts to correctly classify the generated data objects as real or synthetic. The discriminator model and generator model are co-trained so that both models are improved. Then, in a generative adversarial network, the generator model is used to generate training data to train a system classifier while the discriminator model is discarded. In the present application, the discriminator application is further trained to classify adversarial data objects and real data objects into an authenticity binary class indicating whether the adversarial data object or real data object is real or synthetic. Adversarial data objects are data objects that are used in system attacks rather than only training data. Thus, adversarial data objects represent how a user or computer system intentionally and maliciously tries to trick the computing system. Once the discriminator model is further trained, the discriminator model is deployed to a production system to classify new data objects as real or synthetic. The output of the discriminator model may be transmitted to a system classifier that determines information from the data object.

Figure 1:
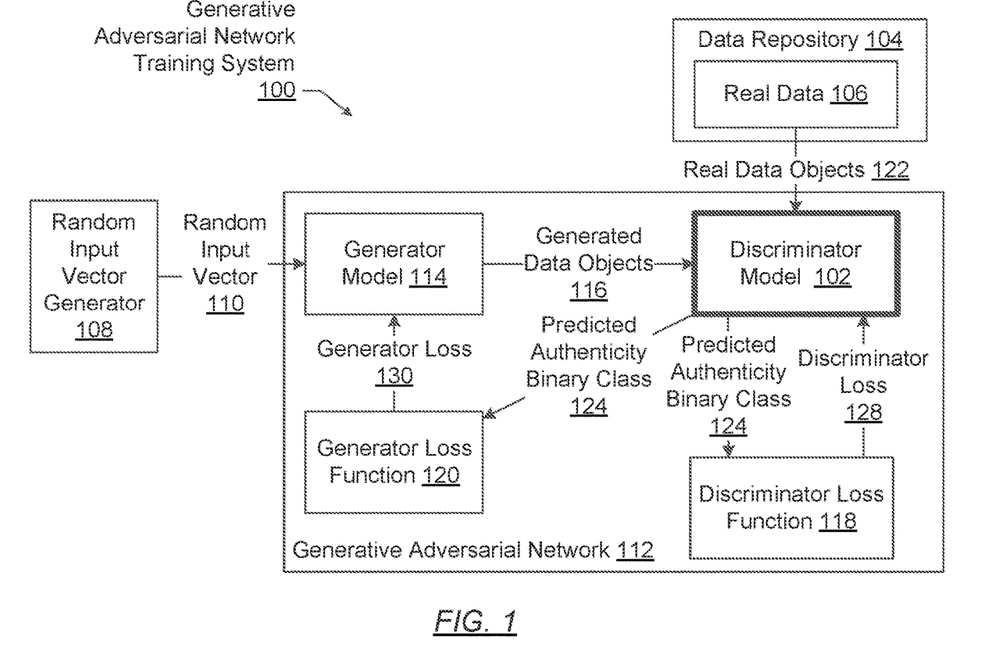
FIG. 1 shows a diagram of a generative adversarial network training system for training a discriminator model.
Figure 2:
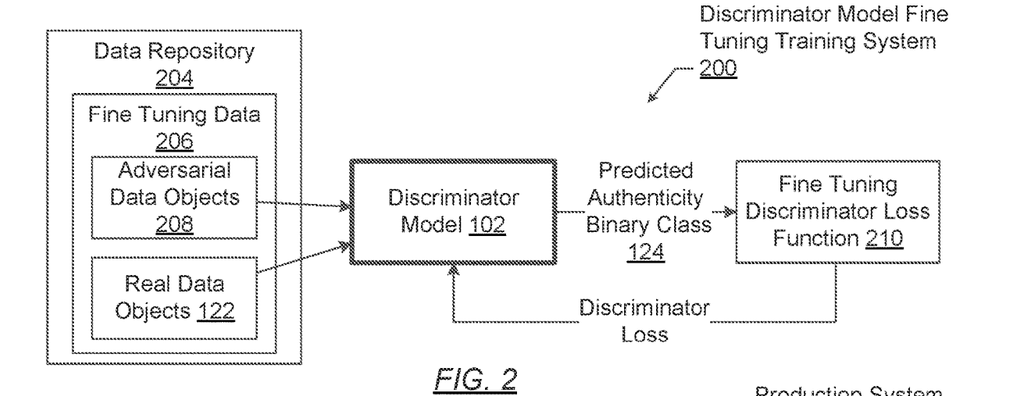
FIG. 2 shows a diagram of a discriminator model fine tuning training system in accordance with one or more embodiments.
Figure 3:
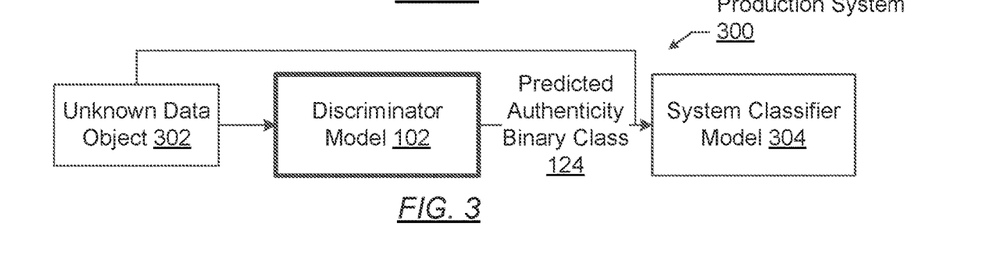
FIG. 3 shows a diagram of a production system with a discriminator model in accordance with one or more embodiments.

FIG. 1, FIG. 2, and FIG. 3 show diagrams of a system in accordance with one or more embodiments. FIG. 1 shows a diagram of a generative adversarial network training system (100) for training a discriminator model (102). The generative adversarial network training system (100) includes a data repository (104) storing real data (106), random input vector generator (108) configured to create a random input vector (110), and a generative adversarial network (112).

In one or more embodiments of the invention, a data repository (104) is any type of storage unit and/or device (e.g., a file system, database, data structure, or any other storage mechanism) for storing data. Further, the data repository (104) may include multiple different, potentially heterogeneous, storage units and/or devices.

The data repository (104) in FIG. 1 includes functionality to store real data (106). Real data (106) is data that is authentic. Real data (206) is true, quantitative or qualitative information, collected from real-life phenomena. For example, real data may be actual data with contents collected from a target system or user or a real picture or scanned image of contents obtained with a camera or scanner. The real data (106) is unaltered in a manner that changes the contents. Real data (106) is different than synthetic data, which may be generated or otherwise materially perturbed so as to have inaccurate contents or contents that are not from an actual system or user. While both real data and synthetic data may be preprocessed, the preprocessing may only adjust the formatting of the data, to perform optical character recognition, or to correct imperfections that do not affect the contents of the data.

A data object is a unit of data that is processed as a unitary whole by the discriminator. Specifically, the data object is the smallest size unit of data for which the discriminator model (102) makes the real or synthetic prediction.

The real data, and correspondingly, the real data objects (122), are of a particular type. The type of real data defines the type of generative adversarial network. For example, the real data objects (122) may each be an image having certain characteristics, such as an official identification card, an image of a form, or another type of data object. As another example, the real data objects (122) may each be optical character recognition data extracted from a form, a record having attribute name, attribute value pairs for different attributes, or other collection of text. The generative adversarial network (112) may be configured to operate with other types of real data objects without departing from the scope of the claims.

A random input vector generator (108) is configured to generate a random input vector (110). The random input vector (110) is a sequence of random values that is a seed to the generator model (114). Because the random input vector generator (108) is a program executed by a computer, the random input vector (110), while appearing random, includes pseudorandom values as known by those skilled in the art.

Continuing with FIG. 1, a generative adversarial network (112) is a machine learning framework for training generator model (114) to generate realistic data. Realistic data is data that cannot be distinguished by the discriminator model or a human as being real or synthetic. The generative adversarial network (112) includes the generator model (114), the discriminator model (102), the discriminator loss function (118), and the generator loss function (120). The generator model (114) is a neural network model that includes multiple neural network layers. The first layer of the generator model (114) is configured to take the random input vector as input (110). The last layer of the generator model (114) is configured to output a generated data object (116). The type of neural network layers is dependent on the type of real data objects that the generator model (114) is configured to mimic. For example, FIG. 7, described below, shows a generator model (114) that is configured to generate an image.

Continuing with FIG. 1, the output of the generator model (114) are generated data objects (116). A generated data object (116) is a data object that is generated from a random input vector (110). Namely, rather than being a modified form of a real data object, the generated data object (116) is newly created data object that is generated from random data values (i.e., the random input vector). Through training, the generated data objects (116) generated by the generator model better and better mimic the characteristics of real data objects (122) and, thus, are realistic data. For example, if the real data object are government issued identification cards for people, then the generated data object each appear like government issued identification cards.

The discriminator model (102) is a neural network model that is configured to receive, as input, real data objects (122) and generated data objects (116) and output a predicted authenticity binary class (124) for each data object (e.g., real data object, generated data object). The predicted authenticity binary class (124) is a class that may have one of two values, whereby one value indicates data object is real and the other value indicates that the data object is synthetic. Namely, the discriminator model (102) is a binary classifier that outputs a prediction as to whether the input data object is real or synthetic as the predicted authenticity binary class (124). The discriminator model (102) may also output a confidence of the prediction. The type of neural network of the discriminator model is dependent on the type of real data objects (122). When the type of real data object is an image, the discriminator model (102) may be a recurrent neural network. When the type of real data object is image, the discriminator model (102) may be a convolutional neural network. For example, FIG. 8, described below, shows an example discriminator model when the type of real data objects is an image.

The predicted authenticity binary class (124) is passed to a discriminator loss function (118) and the generator loss function (120). The discriminator loss function (118) and the generator loss function (120) are configured to compare the predicted authenticity binary class (124) with correct class of the data object (e.g., real data object (122), generated data object (116)) to determine whether the discriminator model (102) was accurate in the prediction. The discriminator loss function and the generator loss function (120) are configured to calculate a discriminator loss (128) and a generator loss (130), respectively, which correspond to parameter updates to the respective discriminator model and generator model. Notably, the discriminator loss and the generator loss are in an inverse relationship. The discriminator loss is decreased if the discriminator model is accurate while the generator loss is increased. The discriminator loss is increased if the discriminator model is inaccurate while the generator loss is decreased. Through backpropagation through the models, the parameters of the discriminator model (102) and the generator model (114) are updated. The losses are functions of the gradient (partial derivative) of the prediction error with respect to each parameter.

When convergence of the loss functions is achieved, the generator model is a trained generator model and the discriminator model is a trained to discriminate whether an image is real or synthetic.

Once trained, one or more embodiments perform fine tuning on the discriminator model (102). The fine tuning is transfer learning between the task of distinguishing between generated data objects and real data objects to the task of distinguishing between real data objects versus adversarial data objects. FIG. 2 shows a diagram of a discriminator model fine tuning training system (200) in accordance with one or more embodiments. The discriminator model fine tuning training system (200) includes a data repository (202) connected to the discriminator model (102) of FIG. 1, which is updated by a fine tuning discriminator loss function (204). The data repository (202) includes fine tuning data (206). The fine tuning data (206) is training data that is used to train the discriminator model (102) to operate in production. As such, the fine tuning data (206) is correctly classified data and includes both real data objects (122), as described above in reference to FIG. 1, and adversarial data objects (208). The real data objects may be different data objects in the real data than the real data objects used to training the discriminator model for the generative adversarial network described in FIG. 1. Namely, different and randomized selection of subsets of real data may be used for training the discriminator model when the discriminator model is part of the generative adversarial network as compared to performing fine tuning training of the discriminator model (102).

The adversarial data objects (208) are historical data objects that were previously used in known attacks to the system. Adversarial data objects (208) are not completely generated by a computer, rather adversarial data objects (208) have modified contents of one or more real data objects. For example, adversarial data objects (208) may be a real data object with some of the values (e.g., textual or pixel values) modified to have different contents. By way of an example, the adversarial data object may be a scanned image of a government issued identification card with the name and picture changed to a different name and picture. As another example, the adversarial data object may be a table with some of the values changed so as to be fundamentally different values, as compared to just rounded values. Thus, whereas the generated data objects (116) are generated for a system classifier model to have additional training data to perform a classification of contents and are used by the discriminator model to train the generator model, the adversarial data objects are training data to discriminator model. The adversarial data objects (208) represent the type of data objects that may be used in production by actual users or computers attempting to attack the system.

The discriminator model (102), during training, receives adversarial data objects (208) and real data objects (122), as input, and outputs the predicted authenticity binary class (124). The predicted authenticity binary class (124) is the same as described above in FIG. 1. The predicted authenticity binary class (124) is transmitted to a fine tuning discriminator loss function (210). The fine tuning discriminator loss function (210) may be the same or similar to the discriminator loss function (118), described above with reference to FIG. 1. The fine tuning discriminator loss function (210) is configured to compare the predicted authenticity binary class (124) with the correct class of the data object (e.g., adversarial data object (208) or real data object (122)) to determine a prediction error. The discriminator loss (212) is a function of the gradient (partial derivative) of the prediction error with respect to each parameter of the discriminator model (102).

Once trained, the discriminator model (102) may be deployed to production. FIG. 3 shows a diagram of a production system (300) with the discriminator model (102) in accordance with one or more embodiments. The discriminator model (102) is the same as discussed above with reference to FIG. 1 and FIG. 2. In the production system (300), the discriminator model (102) receives, as input, an unknown data object (302) and outputs a predicted authenticity binary class (124) for the unknown data object (302). The unknown data object (302) is unknown to the system and a target of the system classifier model (304). The unknown data object (302) may be real or synthetic and has contents that are not known to the system.

The discriminator model (102) in the production system (300) is a trained model that reflects the distribution of features of real and adversarial data objects. The discriminator model (102) outputs the predicted authenticity binary class (124) to the system classifier model (304). The system classifier model (304) is a neural network model trained to determine information from the contents of the unknown data object (302). For example, the system classifier model (304) may be a multi-class model configured to output one or more of more than two possible classes of the contents of the unknown data object. As another example, the system classifier model (304) may be an encoder decoder model configured to extract contents of a document. As another example, the system classifier model (304) may be configured to determine a boundary of contents in an image. Other types of system classifier models (304) may be used. Further, the system classifier model (304) may be a combination of multiple machine learning models. The system classifier model (304) uses the unknown data object (302) and the predicted authenticity binary class (124) to generate output. The system classifier model (304) may further be configured to present the output, such as to an interface or to storage.

While FIGS. 1-3 show a configuration of components, other configurations may be used without departing from the scope of the invention. For example, various components may be combined to create a single component. As another example, the functionality performed by a single component may be performed by two or more components.

Figure 4:
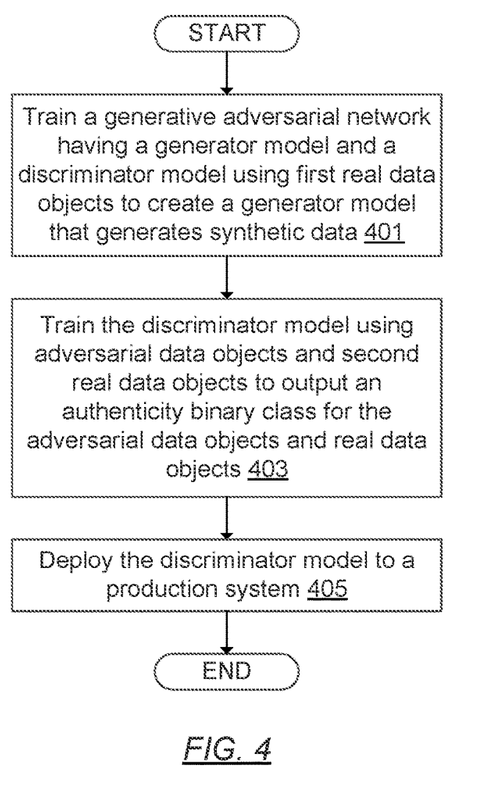
FIG. 4 shows a flowchart for training a discriminator model of generative adversarial network architecture.
Figure 5:
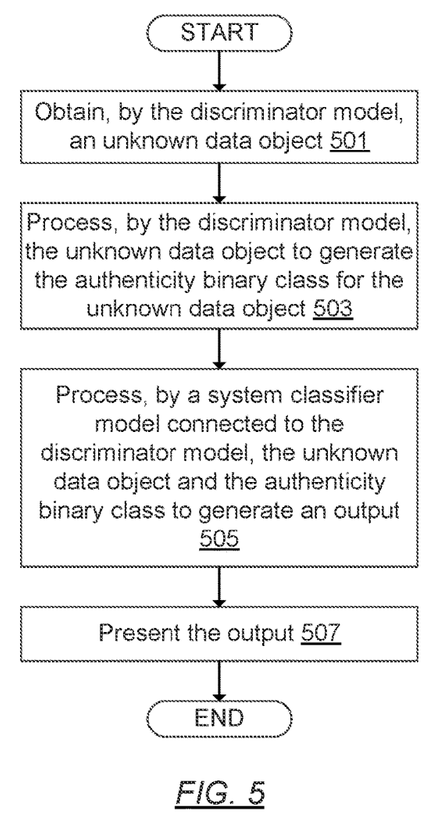
FIG. 5 shows a flowchart for performing adversarial detection using discriminator model of generative adversarial network architecture.

FIG. 4 and FIG. 5 show flowcharts in accordance with one or more embodiments. FIG. 4 shows a flowchart for training a discriminator model and FIG. 5 shows a flowchart for using the discriminator model in production. While the various steps in these flowcharts are presented and described sequentially, at least some of the steps may be executed in different orders, may be combined, or omitted, and at least some of the steps may be executed in parallel. Furthermore, the steps may be performed actively or passively.

Turning to FIG. 4, in Block 401, a generative adversarial network having a generator model and a discriminator model is trained using first real data objects to create a generator model that generates realistic data. Training the generative adversarial network includes the following operations. The random vector generator generates random input vectors, which are passed to the generator model. The generator model executes on the random input vectors to produce generated data objects from the random input vectors. The discriminator model classifies the generated data objects and the first real data objects to obtain a predicted authenticity binary class for each of the generated data objects and the first real data objects. The discriminator loss function is executed using the predicted authenticity binary class to obtain a discriminator loss. For each data object, the discriminator loss function compares the predicted authenticity binary class for the data object with the actual authenticity binary class to generate a discriminator loss. The discriminator model is then updated with the discriminator loss. Through backpropagation of the discriminator loss, the parameters of the discriminator model are updated. Similarly, the generator loss function compares the predicted authenticity binary class for the data object with the actual authenticity binary class for the data object to generate a generator loss. The generator model is updated with the generator loss through back propagation of the generator loss.

In Block 403, the discriminator model is trained using adversarial data objects and second real data objects to output an authenticity binary class for the adversarial data objects and real data objects. Training the discriminator model includes the discriminator randomly receiving, as input, adversarial data objects and second real data objects. The discriminator model classifies the adversarial data objects and the second real data objects to obtain a predicted authenticity binary class for each of the data objects. For each data object, the fine tuning discriminator loss function compares the predicted authenticity binary class for the data object with the actual authenticity binary class to generate a discriminator loss. The discriminator model is then updated with the discriminator loss. Through backpropagation of the discriminator loss, the parameters of the discriminator model are updated.

In one or more embodiments, the fine tuning training of the discriminator model is performed using triplet loss. Triplet loss is a manner of training a model with two adversarial data objects for each single real data object. The triplet loss is a loss function for machine learning algorithms where a reference input (called anchor), which is an adversarial data object, is compared to a matching input (called positive), which is an adversarial object, and a non-matching input (called negative) which is a real data object. The distance from the anchor to the positive is minimized, and the distance from the anchor to the negative input is maximized. By enforcing the order of distances, triplet loss models embed in the way that a pair of samples with same labels are smaller in distance than those with different labels. The loss function can be described using the following Euclidean distance function:

$$\mathcal{L}(A,P,N) = \max(\|f(A)-f(P)\|^2 - \|f(A)-f(N)\|^2 + \alpha, 0)$$

In the above function, A is the anchor input, P is an image of the same binary authenticity class as the anchor image (i.e., both adversarial data objects) and N is an image of the Negative class (i.e., a real data object). Triplet loss may be used to ensure that that, in the next level, the discriminator model has an easier way of classifying adversarial data objects correctly the small number of adversarial examples.

As discussed above, the discriminator model is a neural network having multiple network layers. The output of each hidden network layer (e.g., intermediary network layer) is a vector passed to the next network layer. For the last hidden network layer, the discriminator model is trained such that the vectors of the last hidden network layer for adversarial data objects are close together and distanced from the vectors of the last hidden network layer of the real data objects. Thus, at least two clusters of vectors are produced by the last hidden network layer, whereby the correct classification are close together.

In Block 405, the discriminator model is deployed to the production system. Deploying the discriminator model to the production system may include transferring the code and parameters of the discriminator model to a different computing system and linking the discriminator model to the system classifier model.

Deploying the discriminator model may include training the system classifier model to operate with the trained discriminator model. The system classifier model may be trained on first, second, and third real data objects to classify the real data objects or to output locations of real data objects. The training may be performed in a same or similar manner to training the generator model and the discriminator model. For example, the system classifier model generates a prediction, and the prediction is compared to the actual output in order to calculate a loss, which is used to update the system classifier model.

FIG. 5 shows a flowchart for using the discriminator model in production in accordance with one or more embodiments. In Block 501, the discriminator model obtains an unknown data object. For example, the unknown data object may be passed as input to a user level application, such as by being uploaded into the user level application, transmitted in a batch process to the user level application, or otherwise provided to the user level application. The user level application may pass the unknown data object to a security application, which triggers execution by the discriminator model. In some embodiments discriminator model may operate as a service or a part of a service that is triggered by the storage of the unknown data object. In response, the discriminator model obtains the unknown data object. Other operations may exist that trigger the execution of the discriminator model on an unknown data object.

In Block 503, the discriminator model processes the unknown data object to generate an authenticity binary class for the unknown data object. The unknown data object is passed as input to the discriminator model. The discriminator model processes the unknown data object through the series of neural network layers, whereby each layer obtains a vector from a previous layer, processes the vector, and generates an output vector to pass to the next layer. The output of the discriminator model is the predicted authenticity binary class. The output may further include a confidence value that specifies a probability that the prediction is accurate.

In Block 505, the system classifier model connected to the discriminator model processes the unknown data object and the authenticity binary class to generate an output. The authenticity binary class and the confidence value may be used as features, with the unknown data object, to the system classifier model. In some embodiments, the system classifier model includes a preprocessor that obtains the predicted authenticity binary class for the unknown data object. If the predicted authenticity binary class indicates that the unknown data object is synthetic, then the unknown data object may be dropped without further processing. Further, an error may be transmitted indicating that unknown data object is deemed synthetic and therefore will not be processed. In some embodiments, if the discriminator model outputs a confidence value, the preprocessor checks whether both the predicted authenticity binary class indicates the unknown data object is synthetic and the confidence value is above a predefined threshold. If both the predicted authenticity binary class indicates the unknown data object is synthetic and the confidence value is above the predefined threshold, then the preprocessor drops the unknown data object without further processing.

If the predicted authenticity binary class indicates that the unknown data object is real, then the system classifier model processes the unknown data object to classify the contents of the unknown data object. The contents of the unknown data object are the parts of the unknown data object that are visible when displayed in a native program and are data format independent.

In Block 507, the output is presented. Presenting the output may include transmitting the output to a downstream system, storing the output, or performing another operation.

Figure 6:
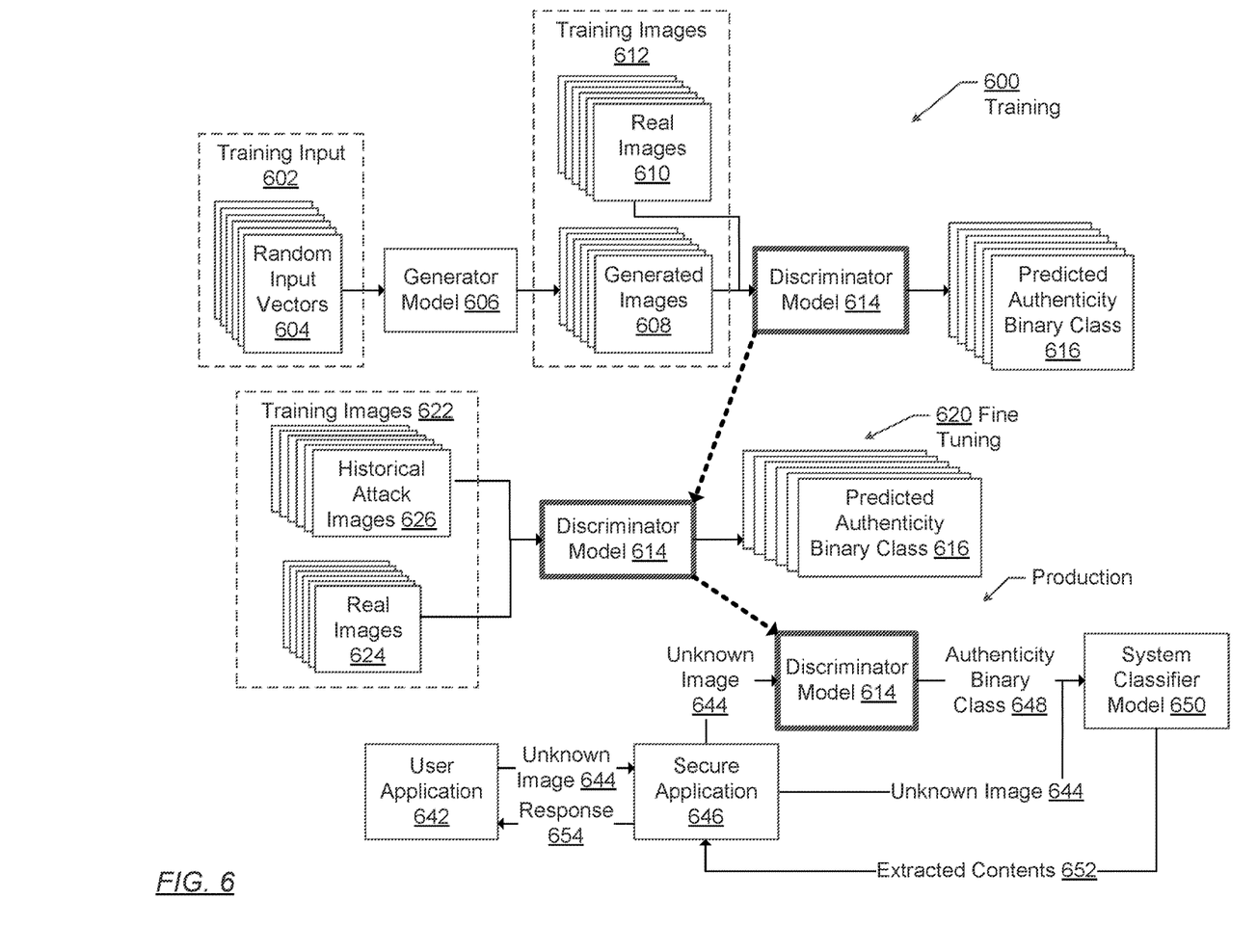
FIG. 6 shows an example of adversarial detection using discriminator model of generative adversarial network architecture.
Figure 7:
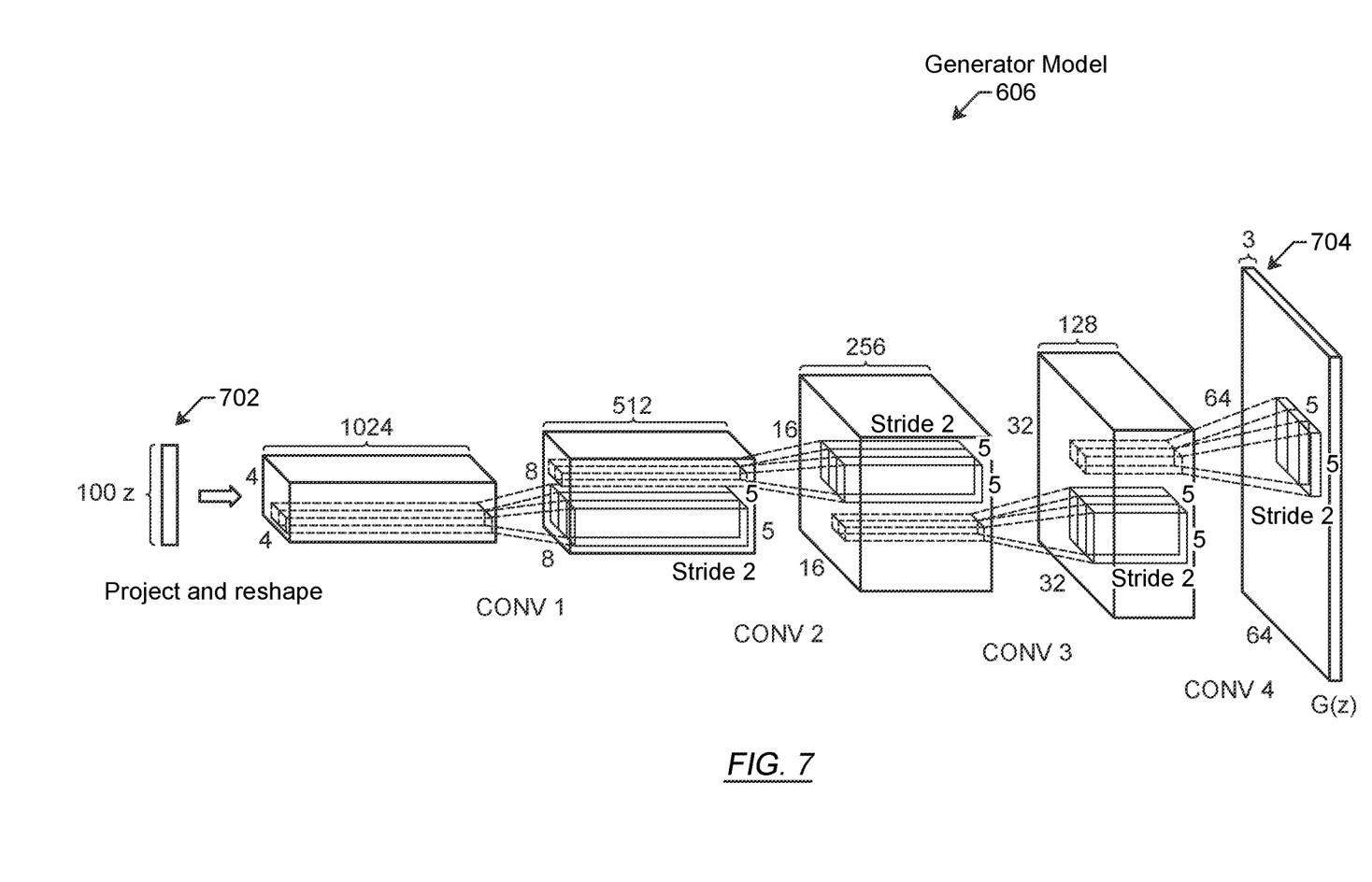
FIG. 7 shows an example of a generator model in accordance with one or more embodiments.
Figure 8:
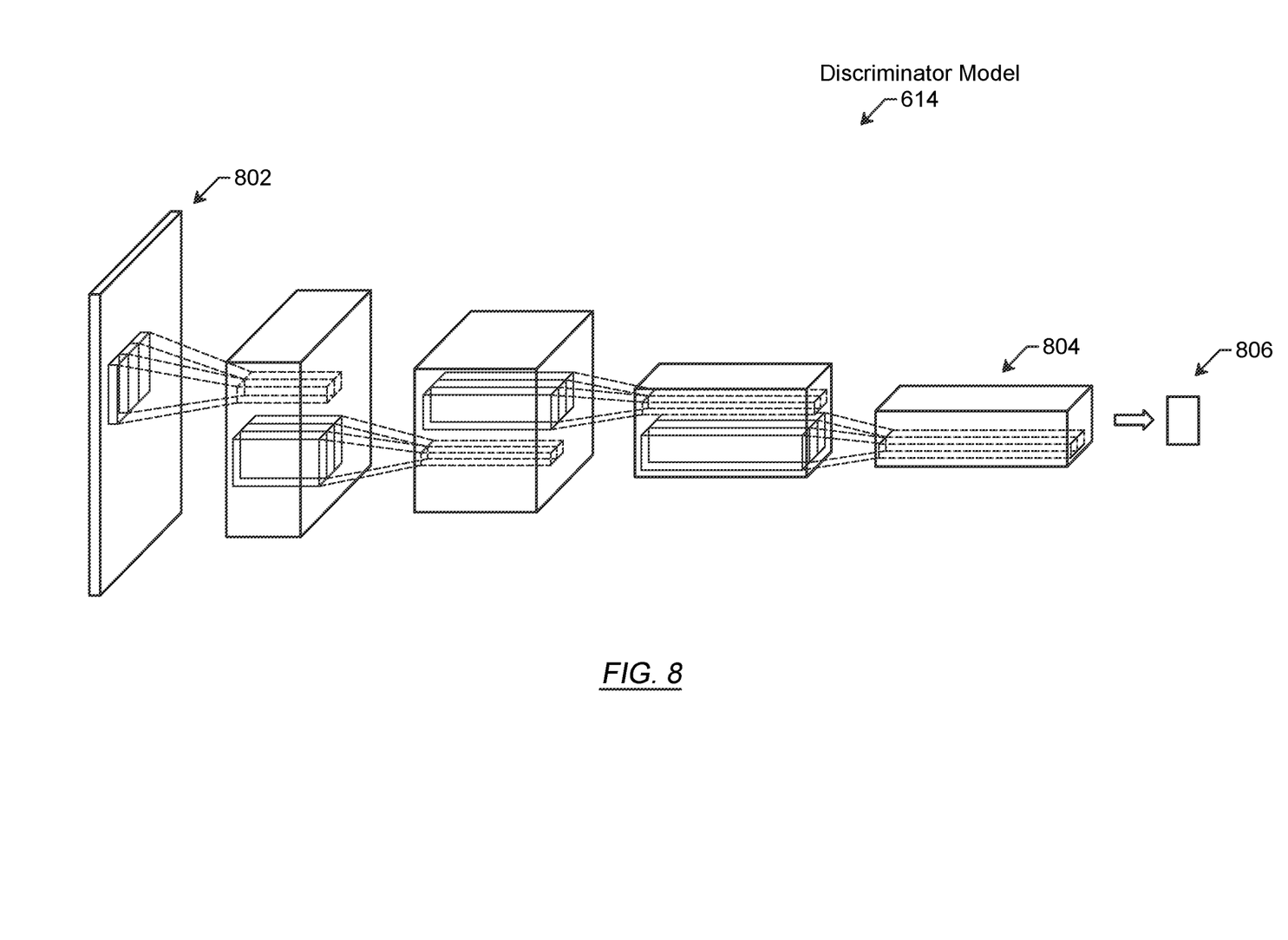
FIG. 8 shows an example of a discriminator model in accordance with one or more embodiments.

FIGS. 6, 7, and 8 show examples in accordance with one or more embodiments. The following example is for explanatory purposes only and not intended to limit the scope of the invention. In the example, the data objects are images. For example, the data objects may be scanned images of handwritten tax forms. An attacker may want to commit fraud by changing a form that the attacker receives from a financial institution. FIG. 6 shows a diagram of a system in accordance with one or more embodiments. The various components shown in FIG. 6 are examples of the like-named components in FIGS. 1, 2, and 3.

As shown in FIG. 6, for training (600) the generative adversarial network, training input (602) that has random input vectors (604) is passed to the generator model (606). For each random input vector (604), the generator model (606) generates a generated image (608) to create multiple generated images (608).

The generator model (606) is trained to learn a mapping between the generator model's input, the random input vector (604), sampled from normal or uniform distribution, in some latent space, to the generator model (606) output, which eventually is supposed to be a realistic image taken from the underlying distribution of data images. Without the feedback from the discriminator model (614), the generator model (606) will just output random noise. The feedback from the discriminator model (614) via back propagation is what allows the generator model (606) to eventually converge into a realistic image.

The generator model (606) may be of the form shown in FIG. 7. The boxes of FIG. 7 show the output vector of each of the layers that is used as input to the next layer. The arrows between the boxes correspond to a layer of the generator neural network model. As shown in FIG. 7, the generator model (606) is a convolutional neural network that takes a one dimensional vector (702) as input. A first layer performs projection and reshaping of then neural network layer to generate a 4×4×1024 vector of values. Through a series of convolutional layers (denoted as conv 1, conv 2, conv 3, and conv 4), the 4×4×1024 vector is transformed to a 64×64×3 vector. The 64×64 corresponds to image having 64×64, or 4096, pixels. The depth of 3 corresponds to the 3 color values (e.g., Red Green Blue) for each of the 4096 pixels. G(z) (704) in FIG. 7 is a generated image.

Returning to FIG. 6, the generated images (608) and real images (610) are combined into training images (612) used to train the discriminator model (614). The generated images (608) are generated to mimic the real images (610) so as to try and trick the discriminator model (614) into inaccurately predicting that the generated images are real images. Thus, in the tax form example, the generated images may appear as a tax form. The discriminator model (614) outputs a predicted authenticity binary class (616) for each image.

The discriminator model (614) is a classifier that receives, as input, real images and generated images. The discriminator model (614) is trained to output whether an image is synthetic or real. The same discriminator model (614) will provide feedback to the generator model (606). The output is the probability that the input image is real. If the image is real, then the predicted authenticity binary class should be one. If the image is generated, the predicted authenticity binary class should be zero. The predicted authenticity binary class may be a value between zero and one indicating the confidence level of the prediction. For example, a value close to zero or one indicates a higher confidence level whereas a value close to 0.5 indicates a lower confidence level.

An example of a discriminator model (614) is shown in FIG. 8. As shown in FIG. 8, the discriminator model (614) is a convolutional neural network. The input image is a 64×64×3 vector. Through a series of convolutional layers (denoted as conv 1, conv 2, conv 3, and conv 4), the vector is transformed to a one dimensional vector having a value F(x). Through training, the last hidden layer vector has a property that the vector distances between the last hidden layer vector (804) of real images are close to each other in vector space and distant from the last hidden layer vector (804) of generated images. Similarly, through training, the vector distances between the last hidden layer vector (804) of generated images are close to each other in vector space and distant from the last hidden layer vector (804) of real images. The one dimensional vector (806) stores the predicted authenticity binary class.

Through the above process of training (600), the discriminator model (614) identifies features that contribute to real images. Further, the generator model (606) creates images matching the real image). Thus, the generator model may be trained by backpropagating this target value back to the generator. Both networks may be trained in alternating steps and lock them into a competition to improve themselves. Eventually, the discriminator model identifies the tiny difference between the real images and the generated images, and the generator model creates images that the discriminator cannot tell the difference. The generative automated network model eventually converges and produces natural look images.

Returning to FIG. 6, once training is completed for the generative adversarial network, the fine tuning training (620) is performed on the discriminator model (614). The fine tuning training (620) includes using training images (622) that have real images (624) and historical attack images (626). Historical attack images (626) are copies of the tax form that have been computer and user manipulated to change the contents and commit fraud. The discriminator model (614) in the fine tuning training learns the distribution of features of the historical attack images (626) and the real images (624) in order to distinguish between the historical attack images (626) and the real images (624). Through fine tuning training (620), the predicted authenticity binary class (616) output by the discriminator model (614) becomes a more accurate prediction.

The discriminator model (614) is a network that is trained that, given an input image, the discriminator model (614) knows to output the likelihood that the input image is taken from the original distribution of learnt real images. An image that has been tampered with (adversarial examples), even if indistinguishable from the original to humans, is unlikely to be generated naturally from the original distribution and therefore will receive a lower score.

Using examples of previously detected adversarial data points (e.g., the historical attack images (626)) for fine tuning, the discriminator model (614) is trained for the specific task of "adversarial" data detection. However, the original task the discriminator model (614) was trained on during training (600) was detecting unrealistic images and not detecting tampered images. Thus, the fine tuning (620) is performed in order to refine the classification. The fine tuning (620) is via back propagation for the task of differentiating between adversarial examples and real examples. Because the fine tuning (620) is performed on the pre-trained discriminator model (614) from the training (600), only a small sample of historical attack images (626) are enough to complete the training.

Once fine tuning training (620) is performed, the discriminator model may be used in production (640). In production, a user application (642), such as a financial application, receives a scanned image of a tax form as input. The scanned image of the tax form is an unknown image (644). The user application (642) passes the unknown image (644) to a secure application (646). The secure application (646) may be an application that exists on a server and performs initial processing of unknown images. The secure application (646) passes the unknown image (644) to the discriminator model (614). Because the discriminator model (614) is trained based on historical attack images (626), the discriminator model (614) is able accurately predict the authenticity binary class (648) of the unknown image (644). The discriminator model (614) passes the authenticity binary class (648) to the system classifier model (650), which also uses the unknown image (644) as input to generate output. If the authenticity binary class (648) indicates that the unknown image (644) is synthetic, the system classifier model (650) may drop the unknown image (644) and issue an error. If the authenticity binary class (648) indicates that the unknown image (644) is real, the system classifier model (650) may extract contents from the unknown image (644), which is a tax form, and output extracted contents (652). The extracted contents (652) may be transmitted to the secure application (646), which uses the extracted contents (652) to prepare a tax form. The secure application (646) may transmit a response (654) based on the processing to the user application (642).

Figure 9A:
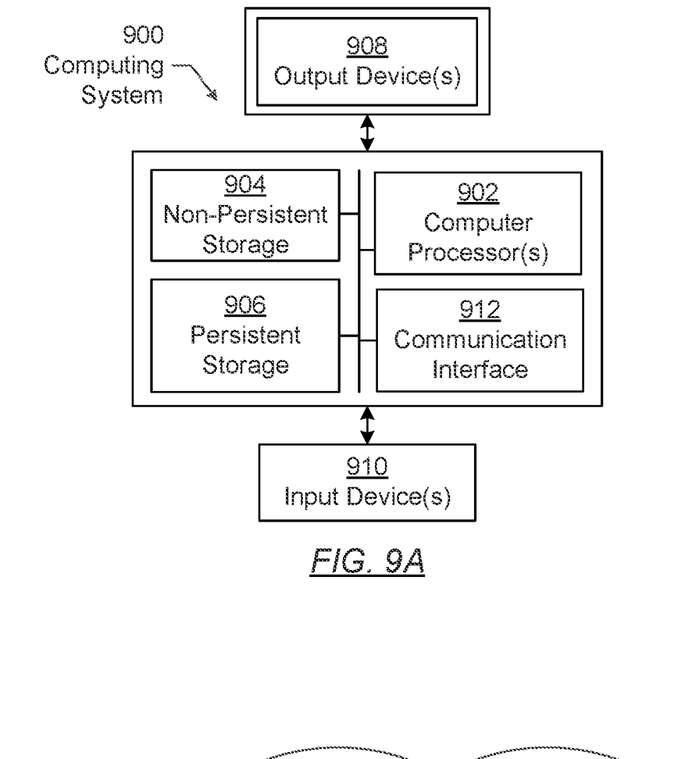
FIG. 9A and FIG. 9B show a computing system in accordance with one or more embodiments of the invention.

Embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 9A, the computing system (900) may include one or more computer processors (902), non-persistent storage (904), persistent storage (906), a communication interface (912) (e.g., Bluetooth interface, infrared interface, network interface, optical interface, etc.), and numerous other elements and functionalities that implement the features and elements of the disclosure. The computer processor(s) (902) may be an integrated circuit for processing instructions. For example, the computer processor(s) may be one or more cores or micro-cores of a processor. The input devices (910) may include a touchscreen, keyboard, mouse, microphone, touchpad, electronic pen, or any other type of input device. The communication interface (912) may include an integrated circuit for connecting the computing system (900) to a network (not shown) (e.g., a local area network (LAN), a wide area network (WAN) such as the Internet, mobile network, or any other type of network) and/or to another device, such as another computing device.

Further, the output devices (908) may include a display device, a printer, external storage, or any other output device. One or more of the output devices may be the same or different from the input device(s). The input and output device(s) may be locally or remotely connected to the computer processor(s) (902). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 9B:
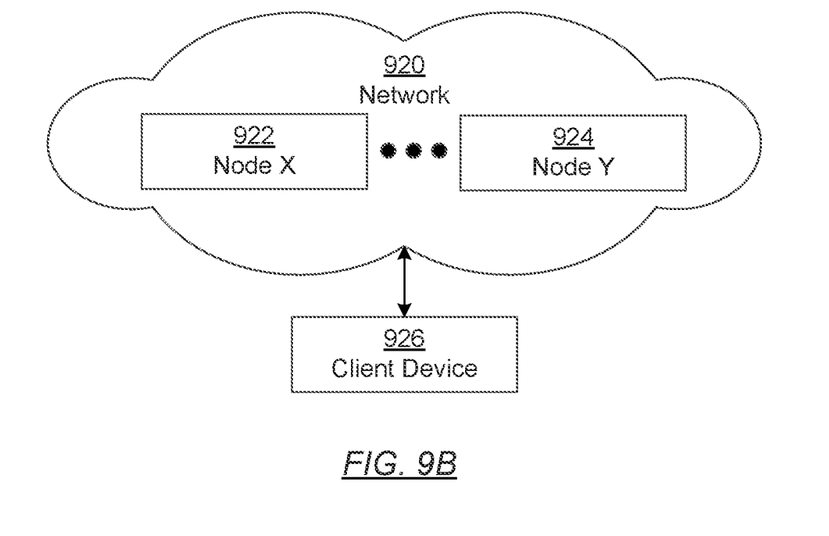

The computing system (900) in FIG. 9A may be connected to or be a part of a network. For example, as shown in FIG. 9B, the network (920) may include multiple nodes (e.g., node X (922), node Y (924)). Each node may correspond to a computing system, such as the computing system shown in FIG. 9A, or a group of nodes combined may correspond to the computing system shown in FIG. 9A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (900) may be located at a remote location and connected to the other elements over a network.

The nodes (e.g., node X (922), node Y (924)) in the network (920) may be configured to provide services for a client device (926), including receiving requests and transmitting responses to the client device (926). For example, the nodes may be part of a cloud computing system. The client device (926) may be a computing system, such as the computing system shown in FIG. 9A. Further, the client device (926) may include and/or perform all or a portion of one or more embodiments of the invention.

The computing system of FIG. 9A may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description. Further, other embodiments not explicitly described above can be devised which do not depart from the scope of the invention as disclosed herein. Accordingly, the scope of the invention should be limited only by the attached claims.

What is claimed is:

1. A method comprising:
    performing a first training, using a first plurality of real data objects, of a generative adversarial network having a generator model and a discriminator model to create a trained generator model that generates realistic data, wherein the performing the first training trains both the generator model and the discriminator model;
    performing a second training, using a plurality of adversarial data objects and a second plurality of real data objects, of the discriminator model to output an authenticity binary class for the plurality of adversarial data objects and the second plurality of real data objects, wherein the second training is distinct from the first training, wherein the plurality of adversarial data objects are data objects that are used in real system attacks to a production system;
    deploying the discriminator model to the production system;
    outputting, by the discriminator model in the production system, the authenticity binary class of an unknown data object to a system classifier model, wherein the system classifier model is separate from the discriminator model;
    processing, by the system classifier model in the production system, the unknown data object using the authenticity binary class to generate an output; and
    presenting the output.

2. The method of claim 1, wherein performing the first training of the generative adversarial network comprises:
    producing, by the generator model, a plurality of generated data objects from a plurality of random input vectors;
    classifying, the discriminator model, the plurality of generated data objects and the first plurality of real data objects to obtain a predicted authenticity binary class for each of the plurality of generated data objects and the first plurality of real data objects;
    executing a discriminator loss function using the predicted authenticity binary class to obtain a discriminator loss; and
    updating the discriminator model using the discriminator loss.

3. The method of claim 2, wherein performing the first training of the generative adversarial network further comprises:
    executing a generator loss function using the predicted authenticity binary class to obtain a generator loss; and
    updating the generator model using the generator loss.

4. The method of claim 1, wherein performing the second training of the discriminator model comprises:
    classifying, by the discriminator model, the plurality of adversarial data objects and the second plurality of real data objects to obtain a predicted authenticity binary class for each of the plurality of adversarial data objects and the second plurality of real data objects;
    executing a fine tuning discriminator loss function on the predicted authenticity binary class for each of the plurality of adversarial data objects and the second plurality of real data objects to obtain a discriminator loss; and
    updating the discriminator model using the discriminator loss.

5. The method of claim 1, wherein the discriminator model is a convolutional neural network, and wherein the plurality of adversarial data objects and the first plurality of real data objects, and the second plurality of real data objects are images.

6. The method of claim 1, further comprising:
    training the system classifier model to classify contents in the unknown data object.

7. The method of claim 1, further comprising:
    training the system classifier model to output a location of contents in the unknown data object.

8. The method of claim 1, wherein the plurality of adversarial data objects comprises historical data objects from known attacks to the production system.

9. A system comprising:
    a generative adversarial network comprising a generator model and a discriminator model, the generative adversarial network is trained in a first training, using a first plurality of real data objects, to create a trained generator model that generates realistic data, wherein the first training trains both the generator model and the discriminator model; and
    a discriminator model fine tuning training system comprising the discriminator model and configured to train in a second training, using a plurality of adversarial data objects and a second plurality of real data objects, the discriminator model to output an authenticity binary class for the plurality of adversarial data objects and the second plurality of real data objects, wherein the second training is distinct from the first training, wherein the plurality of adversarial data objects are data objects that are used in real system attacks to a production system; and
    the production system comprising the discriminator model after the second training, wherein the production system comprises:
        the discriminator model configured to process an unknown data object to generate the authenticity binary class for the unknown data object, and
        a system classifier model, separate from and connected to the discriminator model, configured to process the unknown data object and the authenticity binary class to generate an output.

10. The system of claim 9, wherein training the generative adversarial network in the first training comprises:
    producing, by the generator model, a plurality of generated data objects from a plurality of random input vectors;
    classifying, the discriminator model, the plurality of generated data objects and the first plurality of real data objects to obtain a predicted authenticity binary class for each of the plurality of generated data objects and the first plurality of real data objects;
    executing a discriminator loss function using the predicted authenticity binary class to obtain a discriminator loss; and
    updating the discriminator model using the discriminator loss.

11. The system of claim 10, wherein training the generative adversarial network in the first training comprises:
   executing a generator loss function using the predicted authenticity binary class to obtain a generator loss; and
   updating the generator model using the generator loss.

12. The system of claim 9, wherein training the discriminator model in the second training comprises:
   classifying, by the discriminator model, the plurality of adversarial data objects and the second plurality of real data objects to obtain a predicted authenticity binary class for each of the plurality of adversarial data objects and the second plurality of real data objects;
   executing a fine tuning discriminator loss function on the predicted authenticity binary class for each of the plurality of adversarial data objects and the second plurality of real data objects to obtain a discriminator loss; and
   updating the discriminator model using the discriminator loss.

13. The system of claim 9, wherein the discriminator model is a convolutional neural network, and wherein the plurality of adversarial data objects and the first plurality of real data objects, and the second plurality of real data objects are images.

14. A method comprising:
   performing a first training, using a first plurality of real data objects, of a generative adversarial network having a generator model and a discriminator model to create a trained generator model that generates realistic data, wherein the performing the first training trains both the generator model and the discriminator model by using the generator model to generate a plurality of generated data objects, and trains the discriminator model to distinguish between the plurality of generated data objects and the first plurality of real data objects;
   performing a second training, using a plurality of adversarial data objects and a second plurality of real data objects, of the discriminator model to output an authenticity binary class for the plurality of adversarial data objects and the second plurality of real data objects, wherein the second training is distinct from the first training, wherein the plurality of adversarial data objects are data objects that are used in real system attacks;
   processing, by the discriminator model, an unknown data object to generate the authenticity binary class for the unknown data object;
   outputting the authenticity binary class to a system classifier model, wherein the system classifier model is separate from the discriminator model;
   processing, by the system classifier model connected to the discriminator model, the unknown data object and the authenticity binary class to generate an output, wherein the system classifier model is a multiple class model configured to output more than two possible classes for contents of the system classifier model; and
   presenting the output.

15. The method of claim 14, wherein performing the first training of the generative adversarial network comprises:
   producing, by the generator model, the plurality of generated data objects from a plurality of random input vectors;
   classifying, the discriminator model, the plurality of generated data objects and the first plurality of real data objects to obtain a predicted authenticity binary class for each of the plurality of generated data objects and the first plurality of real data objects;
   executing a discriminator loss function using the predicted authenticity binary class to obtain a discriminator loss; and
   updating the discriminator model using the discriminator loss.

16. The method of claim 15, wherein performing the first training of the generative adversarial network further comprises:
   executing a generator loss function using the predicted authenticity binary class to obtain a generator loss; and
   updating the generator model using the generator loss.

17. The method of claim 15, wherein performing the second training of the discriminator model comprises:
   classifying, by the discriminator model, the plurality of adversarial data objects and the second plurality of real data objects to obtain a predicted authenticity binary class for each of the plurality of adversarial data objects and the second plurality of real data objects;
   executing a fine tuning discriminator loss function on the predicted authenticity binary class for each of the plurality of adversarial data objects and the second plurality of real data objects to obtain a discriminator loss; and
   updating the discriminator model using the discriminator loss.

18. The method of claim 14, wherein the discriminator model is a convolutional neural network, and wherein the plurality of adversarial data objects and the first plurality of real data objects, and the second plurality of real data objects are images.

* * * * *